June 8, 1971  R. J. BOUCHARD  3,583,931
OXIDES OF CUBIC CRYSTAL STRUCTURE CONTAINING BISMUTH AND AT
LEAST ONE OF RUTHENIUM AND IRIDIUM
Filed Nov. 26, 1969

INVENTOR
ROBERT J. BOUCHARD,

BY *James H. Ryan*

United States Patent Office 3,583,931
Patented June 8, 1971

3,583,931
OXIDES OF CUBIC CRYSTAL STRUCTURE CONTAINING BISMUTH AND AT LEAST ONE OF RUTHENIUM AND IRIDIUM
Robert J. Bouchard, Wilmington, Del., assignor to E. I. du Pont de Nemours and Company, Wilmington, Del.
Continuation-in-part of application Ser. No. 692,108, Dec. 20, 1967. This application Nov. 26, 1969, Ser. No. 880,327
Int. Cl. H01b *1/06*
U.S. Cl. 252—520      25 Claims

ABSTRACT OF THE DISCLOSURE

Certain novel electrically conductive bismuth ruthenium and bismuth iridium oxides, $Bi_2(Ru,Ir)_2O_7$, e.g., $Bi_2Ru_2O_7$ and $Bi_2Ir_2O_7$, and modified such oxides, e.g., $PbBiRu_2O_{6.5}$ and $BiNdIr_2O_7$, are prepared by firing together the appropriate precursors, e.g., the respective oxides. The compounds are useful in electrical resistors.

RELATED APPLICATION

This application is a continuation-in-part of my application Ser. No. 692,108, filed Dec. 20, 1967, now abandoned.

BACKGROUND OF THE INVENTION

(1) Field of the invention

This invention relates to, and has as its principal objects provision of a group of new, electrically conductive, bismuth ruthenium oxides and bismuth iridium oxides and substituted such bismuth-containing oxides, all of pyrochlore-related crystal structure, and use of all of the same in electrical resistors and electrical resistor compositions.

(2) Description of the prior art

The bismuth-containing oxides of this invention are believed to be new compositions of matter. These compositions possess crystal structures that are closely related to that of the mineral known as pyrochlore or pyrochlorite. This mineral has a variable composition generally expressed as $$(Na,Ca)_2(Nb,Ti)_2(O,F)_7$$

but which normally approaches the simpler formulation $NaCaNb_2O_6F$. The structure of the mineral, identifiable by characteristic X-ray reflections, has been described in numerous references [e.g., A. F. Wells, Structural Inorganic Chemistry, third edition, Oxford University Press, London, (1962) pp. 678–82; Ralph W. G. Wyckoff, Crystal Structure, second edition, vol. 3, Interscience Publishers, New York, 1965, pp. 439–41, 449–51; and F. Brisse, The Crystal Chemistry of Pyrochlores, Thesis, Dalhousie University, Halifax, Nova Scotia, March, 1967]. The cubic unit cell of pyrochlore has dimensions of about 10.4 A. and contains 8 formula units of approximate composition $A_2B_2X_7$, where A and B are cations for which the radius of A (i.e., $Na^+$ or $Ca^{2+}$) is greater than that of B (i.e., $Nb^{5+}$ or $Ti^{4+}$) and where X is an anion, i.e., $O^{2-}$ or $F^-$.

Numerous compositions, both natural and synthetic, crystallize with structures similar to that of pyrochlore. These are normally described as having "pyrochlore-related structure" or as being of "pyrochlore type." While pyrochlore-type compositions are basically derived from the general formula $A_2B_2X_7$, the seventh anion is not essential to the stability of the structure, and pyrochlore-related phases with compositions $A_2B_2O_{7-z}$, where $0 \leq z \leq 1$, frequently occur, e.g.,  $AgSbO_3(Ag_2Sb_2O_6)$. Vacancies can also occur in the normally occupied cation positions, particularly those of the large A cations. Compositions of pyrochlore type can be obtained by combining ions of different valencies in a number of ways, e.g., $A_2^{2+}B_2^{5+}O_7$, $A_2^{3+}B_2^{4+}O_7$, $A^{2+}A^{3+}B^{4+}B^{5+}O_7$, and $A^{2+}A^{3+}B_2^{4+}O_{6.5}$. Multicomponent pyrochlore-related phases, such as $A^{2+}A^{3+}B^{4+}B^{5+}O_7$, are normally regarded as "solid solutions" between parent ternary compositions, e.g., $A_2^{2+}B_2^{5+}O_7$ and $A_2^{3+}B_2^{4+}O_7$. The mineral

$$(Na,Ca)_2(Nb,Ti)_2(O,F)_7$$

is itself a complex example of such a solid solution. Though uncommon, a composition with pyrochloro-related structure may be slightly distorted from cubic symmetry.

Characteristically, polynary oxides with pyrochlore-related structures have at least the following features in common: (1) compositions that can generally be formulated as $A_2B_2O_{7-z}$, where $0 \leq z \leq 1$ and wherein A and B are cations, or mixtures of cations, for which the average radius of A is greater than that of B; (2) a characteristic type of X-ray diffraction pattern similar to that of the mineral pyrochlorite and indexable on the basis of a unit cell that is cubic or, rarely, slightly distorted therefrom; (3) unit cell dimensions that are approximately $10.3 \pm 0.5$ A. Pyrochlore-type compositions of formula $A_2Ru_2O_7$ and $A_2Ir_2O_7$, where A is a rare earth cation, are known as are the pyrochlore-related oxides $Bi_2Ti_2O_7$ and $Bi_2Sn_2O_7$.

The following literature references are of interest in connection with the present invention:

(a) In compt. Rend., 349, 829 (1959), Bertaut, Forrat and Montmory report the results of measurements of the crystallographic parameters of pyrochlore-related structures of composition $T_2Ru_2O_7$ where T is a rare earth metal or yttrium.

(b) In J. Appl. Phys., S35, 1205 (1962), Aleonard, Bertaut, Montmory and Pauthenet report synthesis of the pyrochlore-type compositions $M_2Ru_2O_7$ and $M_2Ir_2O_7$ where M=Pr, Nd, Gd, Tb, Dy, Ho and Y. The rare earth ruthenates were prepared by decomposition of a mixture of nitrates. The corresponding series of iridium pyrochlores was prepared by heating the appropriate mixture of metal oxides up to 800° C. in sealed silica tubes.

(c) In J. Am. Ceramic Soc., 45, 18 (1962), Aleshin and Roy report investigations of, inter alia, the replacement of oxygen with halogen in pyrochlore-related structures. A number of multi-element pyrochlore-type compositions are disclosed as is $Bi_2Ti_2O_7$.

(d) In J. Nat. Bur. Stds., 56, 17 (1956), Roth reports X-ray studies of oxides of the formula $A_2B_2O_7$. Most of the compositions studied crystallized in the cubic system with a face-centered cell similar to that found for the mineral pyrochlore, although some were distorted from the ideal cubic structure. Indexed X-ray patterns are given for the cubic "compounds" $Sm_2Ti_2O_7$, $Gd_2Ti_2O_7$, $Dy_2Ti_2O_7$, $Y_2Ti_2O_7$, $Yb_2Ti_2O_7$, $La_2Sn_2O_7$, $Nd_2Sn_2O_7$, $La_2Zr_2O_7$, $Nd_2Zr_2O_7$ and for the possible "compounds" $Y_2O_3 \cdot 2ZrO_2$ and $Nd_2O_3 \cdot 2UO_2$. Unindexed patterns are given for $La_2Ti_2O_7$, $Nd_2Ti_2O_7$ and $Bi_2Sn_2O_7$.

(e) In Compt. Rend., 252, 4171 (1961), Montmory and Bertaut report pyrochlore-related structures for $2MO_2 \cdot T_2O_3$ and $ABO_4 \cdot T_2O_3$ in which T is a trivalent rare earth ion or yttrium, M is a tetravalent ion (Ru,Ir), A and B are ions, respectively, of pentavalent antimony and trivalent iron, chromium or gallium, and M, A and B are elements whose oxides $MO_2$ and $ABO_2$ are isotypical with rutile.

(f) In "Solid State Research," Lincoln Laboratory Report No. ESD–TR–66–403, pp. 21 and 22 (1966), Longo, Raccah and Goodenough, report preparation of $PbRuO_3$, $PbIrO_3$, $BiRhO_3$ and $PbReO_3$ with pyrochlore-type crystal structures and lattice parameters in the range 10.24–10.42 A. Lead ruthenate exhibited metallic conductivity, i.e., had a resistivity of 2.7×10⁻⁴ ohm-cm. at room temperature and 0.9×10⁻⁴ ohm-cm. at 77° K.

(g) In Materials Research Bull. 4, 191 (1969) Longo, Raccah and Goodenough describe the preparation and properties of the oxygen-deficient pyrochlore-type compounds $Pb_2M_2O_{7-x}$ (M=Ru,Ir,Re and x=ca.1). On page 201, the authors speculate that $Bi^{3+}$ might replace $Pb^{2+}$.

SUMMARY AND DETAILED DESCRIPTION OF THE INVENTION

The new compositions of this invention are electrically conductive bismuth-containing oxides of pyrochlore-related crystal structure of the formula $$(M_xBi_{2-x})(M'_yM''_{2-y})O_{7-z}$$

wherein:

M is at least one of the group consisting of yttrium, thallium, indium, cadmium, lead and the rare earth metals of atomic number 57–71, inclusive;

M' is at least one of platinum, titanium, chromium, rhodium and antimony;

M'' is at least one of ruthenium and iridium;

$x$ is a number in the range 0 to 1;

$y$ is a number in the range 0 to about 0.5, with the proviso that $y$ is a number in the range 0 to 1 when M' is rhodium or more than one of platinum, titanium, chromium, rhodium and antimony; and $z$ is a number in the range 0 to 1, being at least equal to about $x/2$ when M is divalent lead or cadmium.

Compositions in which the sole constituents besides bismuth and oxygen are ruthenium and/or iridium, that is the series of compositions ranging from pure $Bi_2Ru_2O_7$ to $Bi_2Ir_2O_7$ can be represented by the formula $$Bi_2(Ru,Ir)_2O_7$$

These $Bi_2(Ru,Ir)_2O_7$ compositions as well as the modified or substituted compositions of the invention, i.e., those of the above formula containing at least one element other than bismuth, oxygen, ruthenium and/or iridium have structures similar to that of the mineral pyrochlore, i.e., they possess pyrochlore-related structures.

While the formulas of the pure bismuth ruthenium oxide and bismuth iridium oxide are described herein as $Bi_2Ru_2O_7$ and $Bi_2Ir_2O_7$, respectively, it is noted above that deviations from precise stoichiometry in compositions of this type can occur both at the positions of the large A-site ions in $A_2B_2O_7$ and in the oxygen positions without changing the structural type. Specifically for oxygen, up to one of the oxygen atoms in the pyrochlore-type oxides $A_2B_2O_7$ may be absent and the structure still retained. Consequently, products deviating from precise stoichiometry fall within the scope of this invention. In particular, up to one-seventh of the oxygen in the $A_2B_2O_7$ oxides may be absent (i.e., $0 \leq z \leq 1$) with, however, the provisos that the pyrochlore-type structure be retained and that $z$ be at least equal to approximately $x/2$ when M is divalent lead or cadmium.

The M metals comprise at least one of the group consisting of yttrium, thallium, indium, cadmium, lead and the rare earth metals of atomic number 57–71, inclusive. Up to one of the bismuth atoms in the $$Bi_2(M'_yM''_{2-y})O_{7-z}$$

compositions of the invention may be replaced by either one or a combination of these M metals provided the total combination of M metals does not exceed one atom per formula unit.

Although the quantities of M' metals that may be homogeneously incorporated in the bismuth-containing pyrochlore-type oxides of this invention normally range up to $y$ values of about 0.5, larger quantities of rhodium, ranging up to $y$ values of at least 1.0, may be introduced. The extent of homogeneous substitution of M' metal in the pyrochlore-type structures may also be increased by employing more than one of the named M' metals as substituents. Thus when M' consists of two or more of platinum, titanium, chromium, rhodium, and antimony, $y$ may range up to about 1.0. The quantities of M' metals introduced into the crystal lattice may sometimes be increased by raising pressure considerably above atmospheric during preparation.

The list of named M' metals is not intended to be all-inclusive, and it will be appreciated that small quantities of other metals, e.g., tin and germanium, may sometimes be incorporated in the bismuth-containing, pyrochlore-type structures of this invention.

The M'' metals include only ruthenium and iridium. These two elements are completely interchangeable in the $(M_xBi_{2-x})(M'_yM''_{2-y})O_{7-z}$ compositions of the invention.

Outstanding among the new pyrochlore-type compositions of this invention is the $Bi_2(Ru,Ir)_2O_7$ series of compositions. These compositions are relatively easy to prepare in pure form and they are not adversely affected when heated with glass binders, the usual procedure employed in the production of screen-printable fired-on resistor compositions. Further, they are electrically conducting with a low resistivity that is virtually independent of temperature over a wide temperature range. Temperature invariance of resistivity is a very unusual property since most metallic materials have resistivities that increase with increasing temperature, and semi-conducting materials have resistivities that decrease with increasing temperature. Consequently, customary metallic materials and semi-conductors are useful as resistors only within narrow temperature ranges. $Bi_2Ru_2O_7$ and $Bi_2Ir_2O_7$ are stable on heating in air to at least 1000° C. Though pyrochlore-type compositions other than $Bi_2Ru_2O_7$, $Bi_2Ir_2O_7$ and the related compositions of this invention are known, many of them are difficult to obtain in pure form. Most of them act as insulators and not as conductors. Among the few known compositions that are electrically conductive, none are known to have low resistivity that is virtually independent of temperature over a wide temperature range. Such substances have not been found useful in resistor compositions or in electrical heating element compositions.

Another valuable property of the oxides of this invention is their remarkable stability under reducing conditions. Use of previously known compounds of paladium and other precious metals in resistor compositions is limited by the drastic change in properties such compounds undergo when exposed to even small amounts of reducing agent, present, for example, in organic encapsulants or generated in nearby parts of solid state circuitry. In contrast, bismuth ruthenium oxide can be heated to 150° C. in hydrogen before reduction to the metals occurs. Substitution of iridium for ruthenium increases stability, and bismuth iridium oxide can be heated to 300° C. before reduction occurs.

Bismuth ruthenium oxide, bismuth iridium oxide, in fact, $Bi_2(Ru,Ir)_2O_7$, may be prepared using a variety of sources of the requisite elements as starting materials. Any ruthenium or iridium composition which, in effect, gives rise, respectively, to $RuO_2$ or $IrO_2$ and which is capable of reacting with $Bi_2O_3$ to form $Bi_2Ru_2O_7$ or $Bi_2Ir_2O_7$ at approximately 600° C. and above may be used as a reactant. These include (1) finely divided elementary ruthenium and iridium when reaction is effected in an oxygen atmosphere, (2) the oxides $RuO_4$ and $IrO_4$ when reaction is effected in a pressure vessel to prevent premature loss of oxygen or volatile oxide, (3) the hydroxides, sulfides, halides, hydroxyhalides, nitrates and ammines of ruthenium and iridium in oxidizing atmospheres, and (4) ruthenium and iridium carbonyls and nitrosyls which must be confined to prevent volatilization before they react with oxygen to form the corresponding dioxides.

A variety of bismuth sources that yield $Bi_2O_3$ at approximately 600° C. or above, in the presence or absence of oxygen, may be used to react with $RuO_2$ and/or $IrO_2$ to form $Bi_2(Ru,Ir)_2O_7$. These include (1) $Bi(OH)_3$ and $BiO(OH)$ in which case reaction is effected in open reactors to permit escape of evolved water, (2) elementary bismuth in which case oxygen is required, (3) bismuth nitrate and bismuthyl nitrate, which are usually hydrated and which require open reactors to permit escape of water and nitrogen oxides during conversion to $Bi_2O_3$, (4) bismuth sulfates and bismuth carbonates which pyrolyze to $Bi_2O_3$, and (5) bismuth sulfide and bismuth halides and oxyhalides under oxidizing conditions.

Bismuth (III) oxide, $Bi_2O_3$, and the dioxides of ruthenium and/or ididium, i.e., $RuO_2$ and/or $IrO_2$, are preferred reactants. The preferred method for preparing $Bi_2(Ru,Ir)_2O_7$ compositions comprises heating together a mixture of the requisite ground oxides present in a ratio of one mole of $Bi_2O_3$ to two moles of $RuO_2$ and/or $IrO_2$. Since the purity of the $Bi_2(Ru,Ir)_2O_7$ produced obviously reflects the purity of the reactants used in its preparation, it is preferred, though not essential, to use pure reactants, e.g., $Bi_2O_3$, $RuO_2$ and $IrO_2$ of 99+% purity.

Bismuth (III) oxide, $Bi_2O_3$, is commercially available, and a pure commercial grade of this oxide can conveniently be used as a starting material. While commercially available catalytic and reagent grades of $RuO_2$ may be used, the form most often used has been obtained by heating finely divided (less than 325-mesh) ruthenium in flowing oxygen for 24 hours at 1000° C. in silica equipment, mechanically grinding the product for 1 hour using an agate mortar and pestle and reheating the ground powder for 2 4hours at 1000° C. in flowing oxygen. The product gives the rutile-type X-ray diffraction pattern typical of $RuO_2$ and an oxygen analysis correct within experimental error for the stoichiometry $RuO_2$ (calculated: 24.05% $O_2$; found: 24.1±0.2% $O_2$). Iridium dioxide cannot be prepared quantitatively by reaction of finely divided iridium and oxygen at red heat. It can be prepared by firing iridium metal in chlorine containing a small amount of CO at 600° C. for several hours to form iridium chloride. The chloride is then heated to 600° C. in oxygen for at least 16 hours to form $IrO_2$. Alternatively a pure, commercially available grade of $IrO_2$ can be employed.

The pure oxides of Bi, Ru and/or Ir are ground together and reaction is effected by firing the properly constituted mixture in compacted or uncompacted form as desired in open or sealed tubes. It is preferred, however, to effect reaction in evacuated sealed tubes to prevent volatilization of reactants and inadvertent contamination. Sealed, evacuated silica and platinum tubes are preferred, although open or sealed vessels of other high-melting, inert materials such as Vycor®, alumina, gold and the like may be used. Likewise, reaction may be effected in any inert, lined or unlined pressure vessel.

The modified bismuth ruthenium oxides and bismuth iridium oxides of this invention in which previously designated M and/or M' metals partially replace Bi, Ru, or Ir in the $Bi_2(Ru,Ir)_2O_7$ structures are prepared in a manner similar to that employed in preparing unmodified $Bi_2(Ru,Ir)_2O_7$ compositions. Fired along with the $Bi_2O_3$, $RuO_2$ and/or $IrO_2$ reactants are the quantities of the oxides of those metals which it is desired to incorporate into the product, e.g., PbO, CdO, $Nd_2O_3$, $TiO_2$, $Sb_2O_4$, mixtures of rare earth oxides, etc. As will be seen from the examples below, the quantities of such metal oxides used depend upon the proportion of the particular metals desired in the product.

In the specific examples below, firing was done in a pre-evacuated vessel as a matter of course. An atmosphere of air, nitrogen, argon, oxygen, etc., may also be used. Reaction pressure is not critical below the dissociation temperature of $Bi_2Ru_2O_7$ and $Bi_2Ir_2O_7$, and reaction may be effected at 0–3000 atmospheres or even at higher pressures in any suitable nonreducing atmosphere, e.g., air or oxygen.

The products of this invention may be produced at temperatures in the approximate range 600–1200° C. or above. Temperatures in the range 750–1000° C. are preferred. At temperatures above about 1100° C., it is preferred to use reaction vessels with a softening temperature higher than silica, e.g., platinum or alumina, and pressurized oxygen may be supplied to the reaction vessel to prevent dissociation of the multicomponent bismuth oxides. Though still within the stated temperature range, it is desirable to use somewhat higher temperatures to obtain single-phase products when iridium (as distinguished from ruthenium) is a component of reaction mixtures.

The time of reaction is not critical. One to 30 hours at reaction temperature is preferred simply as a matter of convenience. If desired, reaction may be effected in the presence of fluxes, e.g., excess $Bi_2O_3$. Fluxes that are chemically inert toward $Bi_2Ru_2O_7$ and $Bi_2Ir_2O_7$ and that have a melting point below reaction temperature are suitable.

When the requisite oxides are employed in quantities calculated to give products of the formula

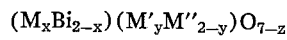
$$(M_xBi_{2-x})(M'_yM''_{2-y})O_{7-z}$$

M, M', M'', x, y and z being as defined earlier, purification of the products is not required. Exact stoichiometry of reactants, however, is not a requirement of this invention, particularly as the formulae for the compositions can deviate somewhat from precise stoichiometry.

When reaction is effected under conditions less ideal than those previously described, crystalline phases in the products may be separated physically, e.g., by manual or flotation techniques, or chemically, e.g., by extraction of impurities. Bismuth oxide, when present in excess, may be extracted with aqueous mineral acids.

Products of the invention in the micron and submicron range, i.e., particles 0.1 micron or less to about 10 microns in size, are preferred for use in resistor compositions since (1) useful resistance ranges are achieved with smaller quantities of oxide and (2) larger quantities of glass can be used leading to smoother, more uniform deposits on ceramic substrates. Particle size is readily reduced to the desired range by ball-milling in a liquid medium, e.g., in an agate mill with water as the liquid medium. Grinding techniques can also be employed, e.g., with agate mortar and pestle.

BRIEF DESCRIPTION OF THE DRAWINGS

All of the novel compositions of this invention have low electrical resistivties and a combination of properties that particularly adapt them to use in electrical resistors and heating elements. These utilities are illustrated in the drawings wherein.

EMBODIMENTS OF THE INVENTION

Figure 1:
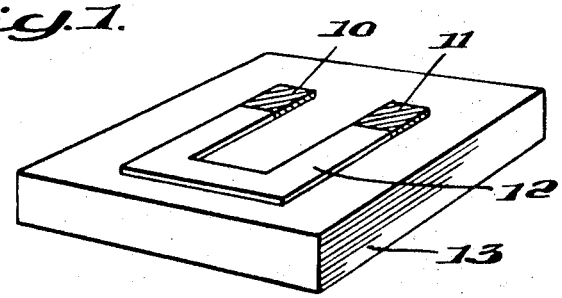
FIG. 1 illustrates a resistor of glass and a composition of this invention as applied to a ceramic substrate.

There follow some nonlimiting examples illustrative of the invention.

EXAMPLE 1

Mixture including $Bi_2Ru_2O_7$

In Example 1 the proportions of reactants do not correspond to those theoretically required for the production of $Bi_2Ru_2O_7$. The weights used corresponded to

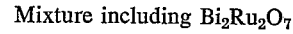
$$2Bi_2O_3 + Ru + 3RuO_2$$

For approximately one hour, 0.6524 g. of $Bi_2O_3$, 0.2794 g. of $RuO_2$ and 0.0708 g. of ruthenium were ground together in an automatic agate mortar grinder. The ground material was pelleted (conditions not critical) in a hand press. The pellets were placed in a silica tube which was evacuated and sealed. The tube was then heated at 1000° C. in a muffle furnace for approximately 24 hours. At the end of this time, the sealed silica tube was withdrawn from the furnace and allowed to cool. The product of the reaction was examined by X-ray diffraction. The resulting X-ray diffraction pattern showed the presence of a cubic pyrochlore phase (corresponding to $Bi_2Ru_2O_7$) in addition to a small amount of Ru metal and $Bi_2O_3$.

EXAMPLE 2

$Bi_2Ru_2O_7$

The proportions of reactants utilized in Example 2 correspond to those theoretically required for the production of $Bi_2Ru_2O_7$, i.e., one mole of $Bi_2O_3$ to two moles of $RuO_2$.

For approximately one hour, 0.9320 g. of $Bi_2O_3$ and 0.5323 g. of $RuO_2$ were ground together in an automatic agate mortar grinder. The ground material was pelleted (conditions not critical) in a hand press. The pellets were placed in a silica tube which was evacuated and sealed. The tube was then fired at 800° C. in a muffle furnace for approximately 24 hours. At the end of this time, the sealed silica tube was withdrawn from the furnace and allowed to cool. The black product was subjected to X-ray analysis. The observed interplanar spacing, $d$, and those calculated assuming a pyrochlore-type structure are represented in Table I.

TABLE I

| Miller indices (hkl) | Peak intensity [1] ($I_0$) | $d$ (observed) | $d$ (calculated) |
|---|---|---|---|
| 111 | 18 | 5.9326 | 5.9464 |
| 311 | 12 | 3.1014 | 3.1054 |
| 222 | 89 | 2.9683 | 2.9732 |
| 400 | 38 | 2.5729 | 2.5749 |
| 331 | 16 | 2.3599 | 2.3679 |
| 511, 333 | 7 | 1.9803 | 1.9821 |
| 440 | 100 | 1.8195 | 1.8202 |
| 531 | 5 | 1.7390 | 1.7404 |
| 533 | 2 | 1.5700 | 1.5708 |
| 622 | 90 | 1.5520 | 1.5527 |
| 444 | 22 | 1.4858 | 1.4869 |
| 711, 551 | 2 | 1.4418 | 1.4426 |
| 731, 553 | 1 | 1.3408 | 1.3407 |
| 800 | 11 | 1.2871 | 1.2876 |
| 733 | 1 | 1.2581 | 1.2582 |
| 751, 555 | 2 | 1.1891 | 1.1892 |
| 662 | 29 | 1.1811 | 1.1814 |
| 840 | 20 | 1.1513 | 1.1515 |
| 911, 753 | 1 | 1.1304 | 1.1305 |
| 844 | 17 | 1.0511 | 1.0511 |
| 933, 771, 755 | 1 | 1.0351 | 1.0351 |
| 66, 10·2·2 | 22 | 0.9911 | 0.9910 |
| 880 | 5 | 0.9104 | 0.9103 |
| 10·6·2 | 16 | 0.8705 | 0.8704 |
| 884, 12·0·0° | 10 | 0.8584 | 0.8582 |

[1] Based on 100 for the strongest line.

The single-phase X-ray pattern of the product of Example 2 was indexed on the basis of a cubic pyrochlore-type pattern where $a_0$, the lattice constant, was equal to 10.30±0.01 A. The unit cell volume was 1092.7±3 cubic angstroms. Since the quantity of reactants had been carefully weighed and since reaction was effected in a sealed tube giving a product that by X-ray diffraction consisted of only one phase, chemical analysis was not necessary.

EXAMPLE 3

$Bi_2Ir_2O_7$

For 30 minutes, 0.4660 g. of $Bi_2O_3$ and 0.4484 g. of $IrO_2$ were ground together with an agate mortar and pestle (quantities corresponding to $Bi_2O_3+2IrO_2$ or $Bi_2Ir_2O_7$). The mixture of ground oxides was pressed, sealed in an evacuated Pt tube, fired at 700° C. for 48 hours and then at 750° C. for 16 hours. The black product was subjected to X-ray diffractometer examination. The X-ray pattern showed a phase with a pyrochlore-related crystal structure ($a_0$=10.33 A.) plus some $IrO_2$.

EXAMPLE 4

$Bi_2Ir_2O_7$

For one hour, 1.1649 g. of $Bi_2O_3$ and 1.1210 g. of $IrO_2$ were ground together with an agate mortar and pestle (quantities corresponding to $Bi_2O_3+2IrO_2$ or $Bi_2Ir_2O_7$). The mixture of ground oxides was pressed, sealed in an evacuated Pt tube and fired at 1000° C. for 16 hours. The resulting black product was subjected to X-ray diffractometer examination. The X-ray pattern showed only a single phase of pyrochlore-related structure with $$a_0=10.3269\pm.0002 \text{ A.}$$

EXAMPLE 5

$CdBiRu_2O_{6.5}$

For 30 minutes, 0.4109 g. of CdO, 0.7455 g. of $Bi_2O_3$, and 0.8516 g. of $RuO_2$ were ground together with an agate mortar and pestle (quantities corresponding to $2CdO+Bi_2O_3+4RuO_2$ or $CdBiRu_2O_{6.5}$). The mixture of ground oxides was pressed, sealed in an evacuated Pt tube, and fired at 1200° C. for 16 hours. The resulting black product was subjected to X-ray diffractometer examination. The X-ray pattern showed that the product had a pyrochlore-related crystal structure with $a_0$=10.20 A. A trace of $RuO_2$ was also present.

EXAMPLE 6

$Bi_{1.5}In_{0.5}Ru_2O_7$

For one hour, 0.1527 g. of $In_2O_3$, 0.7688 g. of $Bi_2O_3$ and 0.5855 g. of $RuO_2$ were ground together with an agate motar and pestle (quantities corresponding to $0.5In_2O_2+1.5Bi_2O_3+4RuO_2$ or $Bi_{1.5}In_{0.5}Ru_2O_7$). The mixture of ground oxides was pressed, sealed in an evacuated Pt tube and fired at 1200° C. for 16 hours. The resulting black product was subjected to X-ray diffractometer examination. The X-ray pattern showed only a single phase of pyrochlore-related crystal structure with $a_0$=10.2461±0.0005 A.

EXAMPLE 7

$NdBiRu_2O_7$

For one hour, 0.5047 g. of $Nd_2O_3$, 0.6989 g. of $Bi_2O_3$ and 0.7984 g. of $RuO_2$ were ground together with an agate mortar and pestle (quantities corresponding to $Bi_2O_3+Nd_2O_3+4RuO_2$ or $NdBiRu_2O_7$). The mixture of ground oxides was pressed, sealed in an evacuated Pt tube and fired at 1000° C. for 16 hours. The resulting black product was subjected to X-ray diffractometer examination. The X-ray pattern showed only a single-phase of pyrochlore-related crystal structure with $a_0$=10.3208±.0003 A.

EXAMPLE 8

$PbBiRu_2O_{6.5}$

For one hour, 0.6429 g. of PbO, 0.6523 g. of $Bi_2O_3$ and 0.7452 g. of $RuO_2$ were ground together with an agate mortar and pestle (quantities corresponding to $2PbO+Bi_2O_3+4RuO_2$ or $2PbBiRu_2O_{6.5}$). The mixture of ground oxides was pressed, sealed in an evacuated Pt tube and fired at 850° C. for 16 hours. The resulting black product was subjected to X-ray diffractometer examination. The X-ray pattern showed principally a product of pyrochlore-related crystal structure and in addition, a trace of $RuO_2$ and several weak peaks. The product was reground for 30 minutes, pressed, sealed in an evacuated Pt tube, and fired at 900° C. for 3 days. The resulting black product now had an X-ray pattern which showed only a pyrochlore-type phase with $a_0$=10.2698±0.0005 A., and several extremely weak additional peaks. No $RuO_2$ was detected after this second firing.

EXAMPLE 9

$BiInRu_2O_7$

For one hour, 0.5591 g. of $Bi_2O_3$, 0.3332 g. of $In_2O_3$ and 0.6387 g. of $RuO_2$ were ground together with an agate mortar and pestle (quantities corresponding to $Bi_2O_3+In_2O_3+4RuO_2$ or $BiInRu_2O_7$). The mixture of ground oxides was pressed, sealed in an evacuated Pt tube and fired at 1200° C. for 16 hours. The black product was subjected to X-ray diffractometer examination. The X-ray pattern showed a phase with the pyrochlore-related crystal structure ($a_0=10.16$ A.) and a trace of unreacted $RuO_2$.

EXAMPLE 10

$Bi_2Ru_{1.8}Rh_{0.2}O_7$

For 30 minutes, 0.5592 g. of $Bi_2O_3$, 0.2874 g. of $RuO_2$ and 0.0324 g. of $RhO_2$ were ground together with an agate mortar and pestle (quantities corresponding to $Bi_2O_3+1.8RuO_2+0.2RhO_2$ or $Bi_2Ru_{1.8}Rh_{0.2}O_7$). The mixture of ground oxides was pressed, sealed in an evacuated Pt tube, fired at 700° C. for 48 hours, then fired at 750° C. for 16 hours. The black product was subjected to X-ray diffractometer examination. The X-ray pattern showed a phase with the pyrochlore-related crystal structure ($a_0=10.30$ A.) and two very weak additional peaks.

EXAMPLE 11

$Bi_2RuRhO_7$

For one hour, 0.6989 g. of $Bi_2O_3$, 0.2023 g. of $RhO_2$ and 0.1996 g. of $RuO_2$ were ground together with an agate mortar and pestle (quantities corresponding to $Bi_2O_3+RhO_2+RuO_2$ or $Bi_2RuRhO_7$). The mixture of ground oxides was sealed in an evacuated Pt tube and fired at 750° C. for 16 hours. The black product was subjected to X-ray diffractometer examination. The X-ray pattern showed a phase with the pyrochlore-related crystal structure ($a_0=10.26$ A.) plus several weak additional lines.

EXAMPLE 12

$Bi_2Ru_{1.7}Ti_{0.3}O_7$

For one hour, 1.0251 g. of $Bi_2O_3$, 0.4524 g. of $RuO_2$ and 0.0479 g. of $TiO_2$ were ground together with an agate mortar and pestle (quantities corresponding to $1.1Bi_2O_3+1.7RuO_2+0.3TiO_2$ or $Bi_2Ru_{1.7}Ti_{0.3}O_7+10\%$ excess $Bi_2O_3$). The mixture of ground oxides was pressed, sealed in an evacuated Pt tube, and fired at 850° C. for 16 hours. The resulting pellet was crushed and leached with conc. $HNO_3$ for 30 minutes to remove excess $Bi_2O_3$, then rinsed with $H_2O$ and dried. The black product was subjected to X-ray diffractometer examination. The X-ray pattern showed a single phase with the pyrochlore-related crystal structure ($a_0=10.30$ A.). Spectographic analysis showed the Ti content of the product to be 1–5% by weight. The calculated weight percent Ti in the above formula is 2%.

EXAMPLE 13

$Bi_2IrRuO_7$

For one hour, 1.3977 g. of $Bi_2O_3$, 0.3993 g. of $RuO_2$ and 0.6726 g. of $IrO_2$ were ground together with an agate mortar and pestle (quantities corresponding to $Bi_2O_3+IrO_2+RuO_2$ or $Bi_2IrRuO_7$). The mixture of ground oxides was pressed, sealed in an evacuated Pt tube, and fired at 1000° C. for 16 hours. The resulting blue-black product was subjected to X-ray diffractometer examination. The X-ray pattern showed a phase with pyrochlore-related crystal structure ($a_0=10.27$ A.) plus several weak additional lines due to unreacted $IrO_2$ or $RuO_2$.

EXAMPLE 14

$GdBiRu_2O_7$

For one hour, 0.5437 g. of $Gd_2O_3$, 0.6989 g. of $Bi_2O_3$ and 0.7984 g. of $RuO_2$ were ground together with an agate mortar and pestle (quantities corresponding to $0.5Gd_2O_3+0.5Bi_2O_3+2RuO_2$ or $GdBiRu_2O_7$). The mixture of ground oxides was pressed, sealed in an evacuated Pt tube and fired at 1000° C. for 16 hours. The resulting black product was subjected to X-ray diffractometer examination. The X-ray pattern showed only a single phase of pyrochlore-related structure with $a_0=10.2684\pm.0005$ A.

EXAMPLE 15

$BiNdIr_2O_7$

For one hour, 0.2796 g. of $Bi_2O_3$, 0.2019 g. of $Nd_2O_3$ and 0.5381 g. of $IrO_2$ were ground together with an agate mortar and pestle (quantities corresponding to $Bi_2O_3+Nd_2O_3+4IrO_2$ or $BiNdIr_2O_7$). The mixture of ground oxides was pressed, sealed in an evacuated Pt tube, and fired at 1200° C. for 16 hours. The resulting black product was subjected to X-ray diffractometer examination. The X-ray pattern showed a single phase with the pyrochlore-related crystal structure ($a_0=10.31$ A.).

EXAMPLE 16

$Bi_2Ir_{1.5}Rh_{0.5}O_7$

For one hour, 0.5126 g. of $Bi_2O_3$, 0.3699 g. of $IrO_2$ and 0.0742 g. of $RhO_2$ were ground together with an agate mortar and pestle (quantities corresponding to $Bi_2O_3+1.5IrO_2+0.5RhO_2$ or $Bi_2Ir_{1.5}Rh_{0.5}O_7$). The mixture of ground oxides was pressed, sealed in an evacuated Pt tube, and fired at 700° C. for 16 hours then at 1000° C. for 24 hours. The resulting black product was subjected to X-ray diffractometer examination. The X-ray pattern showed a phase with the pyrochlore-related crystal structure ($a_0=10.30$ A.) and a trace of unreacted $IrO_2$.

EXAMPLE 17

$Bi_2Ru_{1.8}Ti_{0.2}O_7$

For one hour, 0.0228 g. of $TiO_2$, 0.6657 g. of $Bi_2O_3$ and 0.3422 g. of $RuO_2$ were ground together with an agate mortar and pestle (quantities corresponding to $Bi_2O_3+1.8RuO_2+0.2TiO_2$ or $Bi_2Ru_{1.8}Ti_{0.2}O_7$). The mixture of ground oxides was pressed, sealed in an evacuated silica tube and fired to 950° C. for 12 hours. The resulting black product was subjected to X-ray diffractometer examination. The X-ray pattern showed only a single phase of pyrochlore-related crystal structure.

EXAMPLE 18

$Bi_2Ru_{1.8}Sb_{0.2}O_7$

For one hour, 0.0439 g. of $Sb_2O_4$, 0.6657 g. of $Bi_2O_3$ and 0.3422 g. of $RuO_2$ were ground together with an agate mortar and pestle (quantities corresponding to $Bi_2O_3+1.8RuO_2+0.1Sb_2O_4$ or $Bi_2Ru_{1.8}Sb_{0.2}O_7$). The mixture of ground oxides was pressed, sealed in an evacuated silica tube and fired at 950° C. for approximately 12 hours. The resulting black product was subjected to X-ray diffractometer examination. The X-ray pattern showed only a single phase of pyrochlore type.

EXAMPLE 19

$BiNdIrRuO_7$

A mixture of 0.4659 g. of $Bi_2O_3$, 0.3365 g. of $Nd_2O_3$, 0.4484 g. of $IrO_2$, and 0.2661 g. of $RuO_2$ (quantities corresponding to $Bi_2O_3+Nd_2O_3+2IrO_2+2RuO_2$ or $BiNdIrRuO_7$) was ground for one hour with an agate mortar and pestle, sealed in an evacuated platinum tube, and heated at 1030° C. for 15 hours. The X-ray diffraction pattern of the black product showed a phase with pyrochlore-related crystal structure ($a_0=10.31$ A.) and a trace of unreacted $IrO_2$ or $RuO_2$.

This invention is not to be construed as limited to those compositions shown in the previous examples, and it is to be understood as including any bismuth-containing oxide of pyrochlore-related crystal structure of the formula $(M_xBi_{2-x})(M'_yM''_{2-y})O_{7-z}$ wherein M, M', M'', x, y and z are as defined previously. Additional products falling within the scope of the invention, and molar proportions of reactants that may be used in preparing them, are shown in Table II.

TABLE II

| Reactants and molar ratio in which used | Product |
|---|---|
| ½Bi$_2$O$_3$+½In$_2$O$_3$+RuO$_2$+IrO$_2$ | BiInRuIrO$_7$ |
| ½Bi$_2$O$_3$+½Tl$_2$O$_3$+RuO$_2$+IrO$_2$ | BiTlRuIrO$_7$ |
| ½Bi$_2$O$_3$+½Eu$_2$O$_3$+RuO$_2$+IrO$_2$ | BiEuRuIrO$_7$ |
| ½Bi$_2$O$_3$+½Y$_2$O$_3$+RuO$_2$+IrO$_2$ | BiYRuIrO$_7$ |
| ½Bi$_2$O$_3$+½Gd$_2$O$_3$+RuO$_2$+IrO$_2$ | BiGdRuIrO$_7$ |
| ½Bi$_2$O$_3$+CdO+RuO$_2$+IrO$_2$ | CdBiRuIrO$_{6.5}$ |
| ½Bi$_2$O$_3$+BpO+RuO$_2$+IrO$_2$ | PbBiRuIrO$_{6.5}$ |
| ½Bi$_2$O$_3$+¼Nd$_2$O$_3$+¼Y$_2$O$_3$+RuO$_2$+IrO$_2$ | BiNd$_{0.5}$Y$_{0.5}$RuIrO$_7$ |
| ½Bi$_2$O$_3$+¼Nd$_2$O$_3$+¼In$_2$O$_3$+RuO$_2$+IrO$_2$ | BiNd$_{0.5}$In$_{0.5}$RuIrO$_7$ |
| ½Bi$_2$O$_3$+¼CdO+¼Nd$_2$O$_3$+RuO$_2$+IrO$_2$ | BiCd$_{0.5}$Nd$_{0.5}$RuIrO$_{6.75}$ |
| BiO$_3$+IrO$_2$+½RuO$_2$+½RhO$_2$ | Bi$_2$Rh$_{0.5}$Ru$_{0.5}$Ir'O$_7$ |
| Bi$_2$O$_3$+RuO$_2$+½IrO$_2$+½RhO$_2$ | Bi$_2$Rh$_{0.5}$RuIr$_{0.5}$O$_7$ |
| Bi$_2$O$_3$+RuO$_2$+¼RhO$_2$+½IrO$_2$+¼TiO$_2$ | Bi$_2$RuRh$_{0.25}$Ir$_{0.50}$Ti$_{0.25}$O$_7$ |
| Bi$_2$O$_3$+RuO$_2$+¼RhO$_2$+½IrO$_2$+⅛Sb$_2$O$_4$ | Bi$_2$Rh$_{0.25}$RuIr$_{0.5}$Sb$_{0.25}$O$_7$ |
| ½Bi$_2$O$_3$+½In$_2$O$_3$+RuO$_2$+RhO$_2$ | BiInRhRuO$_7$ |
| ½Bi$_2$O$_3$+½Tl$_2$O$_3$+RuO$_2$+RhO$_2$ | BiTlRhRuO$_7$ |
| ½Bi$_2$O$_3$+½Eu$_2$O$_3$+RuO$_2$+RhO$_2$ | BiEuRhRuO$_7$ |
| ½Bi$_2$O$_3$+½Nd$_2$O$_3$+RuO$_2$+RhO$_2$ | BiNdRhRuO$_7$ |
| ½Bi$_2$O$_3$+½Y$_2$O$_3$+RuO$_2$+RhO$_2$ | BiYRhRuO$_7$ |
| ½Bi$_2$O$_3$+½Gd$_2$O$_3$+RuO$_2$+RhO$_2$ | BiGdRhRuO$_7$ |
| ½Bi$_2$O$_3$+½Sm$_2$O$_3$+RuO$_2$+RhO$_2$ | BiSmRhRuO$_7$ |
| ½Bi$_2$O$_3$+CdO+RuO$_2$+RhO$_2$ | CdBiRhRuO$_{6.5}$ |
| ½Bi$_2$O$_3$+PbO+RuO$_2$+RhO$_2$ | PbBiRhRuO$_{6.5}$ |
| ½Bi$_2$O$_3$+¼Nd$_2$O$_3$+¼Sm$_2$O$_3$+RuO$_2$+RhO$_2$ | BiNd$_{0.5}$Sm$_{0.5}$RhRuO$_7$ |
| Bi$_2$O$_3$+yM'O$_2$+(2−y)M''O$_2$ | Bi$_2$M'$_y$M''$_{2-y}$O$_7$ |
| Bi$_2$O$_3$+yM'O$_2$+(2−y)RuO$_2$ | Bi$_2$M'$_y$Ru$_{2-y}$O$_7$ |
| Bi$_2$O$_3$+yRhO$_2$+(2−y)RuO$_2$ | Bi$_2$Rh$_y$Ru$_{2-y}$O$_7$ |
| Bi$_2$O$_3$+yM'O$_2$+(2−y)IrO$_2$ | Bi$_2$M'$_y$Ir$_{2-y}$O$_7$ |
| $\frac{2-x}{2}$Bi$_2$O$_3$+x/2M$_2$O$_3$+2RuO$_2$ | Bi$_{2-x}$M$_x$Ru$_2$O$_7$ |
| $\frac{2-x}{2}$Bi$_2$O$_3$+x/2M$_2$O$_3$+2IrO$_2$ | Bi$_{2-x}$M$_x$Ir$_2$O$_7$ |

UTILITY

As noted above, the compositions of this invention are useful in electrical applications, e.g., in resistors or in heating elements.

In preparing resistors, the compositions may be applied to and fired on dielectric substrates. The preparation typically involves mixing the electrically conducting composition with a finely divided inorganic binder such as a vitreous enamel or glass, and with a liquid or paste vehicle, e.g., water, alcohols, esters, liquid resins and the like, with or without thickeners. There are thus provided mixtures with consistencies suitable for application to solid dielectric substrates.

After application of the coating mixture to the dielectric substrate by conventional means such as spraying, stencilling, screen printing or brushing, the coated dielectric is fired at an elevated temperature to bond the electrically conductive component. The conductive component must withstand the firing temperature, not react adversely with the vitreous bonding agent at the firing temperature, bond firmly in combination with the finely divided inorganic binder to the dielectric substrate and afford finished resistors or heating elements with suitable resistivity, stability and permanence.

FIG. 1 illustrates a Bi$_2$Ru$_2$O$_7$/glass resistor composition on a ceramic substrate. The thin resistor composition 12 has metal contacts 10 and 11 applied to it for convenience in attaching the resistor to a circuit utilizing its properties. The resistor 12 is firmly bonded to the ceramic substrate 13. The contacts 10 and 11 are of silver applied as silver paste, though any one of a number of metals would be equally suitable. Metal contacts can be applied, for example, by vacuum deposition, electroplating, chemical electroless plating, or, as above, as a paste with subsequent firing at elevated temperature. The only function of the metal is to provide a better contact between the Bi$_2$Ru$_2$O$_7$/glass resistor and the power-conducting leads.

Figure 2:
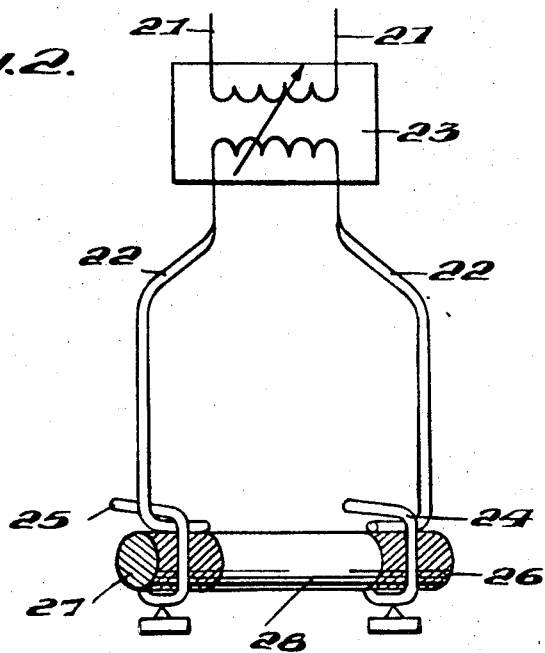
FIG. 2 illustrates an electrical heating element employing a composition of this invention in the production of its heating effect.

In the case of heating elements, the conductive bismuth oxides of the invention in finely divided condition are mixed with powdered dielectric materials such as glass or may simply be pressed into a bar. FIG. 2 illustrates the use of a composition of the invention, e.g., Bi$_2$Ru$_2$O$_7$, in a heating element. In this figure, the input voltage is conducted through the conductive leads 21 to a variable transformer 23 and then led by the conductive leads 22 to bar 28 of Bi$_2$Ru$_2$O$_7$. The leads 22 are connected to the bar by adjustable clamps 24 and 25. To provide a better contact, the ends of the bar are coated with a metal deposit 26 and 27 (in this case silver) applied to the bar as described earlier. The heat generated by the current passing through the bar is regulated by the variable transformer 23.

The useful properties of compositions of this invention and examples of their specific use applications in electrical resistors and heating elements are detailed below:

EXAMPLE A

Bi$_2$Ru$_2$O$_7$ and Bi$_2$Ir$_2$O$_7$ are unusual and useful in that they possess electrical resistivities virtually independent of temperature over a wide temperature range.

(1) Bi$_2$Ru$_2$O$_7$, prepared by the method of Example 2, was reduced in size to a finely divided state and pressed into a bar. The bar was sintered by heating for 3 days at 800° C. (sintering conditions are not critical). The resistivity of the bar was measured over the temperature range 4.2–800° K. by conventional four-probe measurement techniques. At 4.2° K. the resistivity of the Bi$_2$Ru$_2$O$_7$ was $7 \times 10^{-4}$ ohm-cm. while at 800° K. the resistivity had increased to only $9 \times 10^{-4}$ ohm-cm. This represents a relatively small variation in resistivity of about 30% between the temperature extremes.

(2) Bi$_2$Ir$_2$O$_7$, like Bi$_2$Ru$_2$O$_7$, has a resistivity v. temperature curve which is practically flat. This was shown by measuring the resistivity over the range 300–700° K. of a Bi$_2$Ir$_2$O$_7$ pellet, produced as described in Example 4, using the technique described immediately above for Bi$_2$Ru$_2$O$_7$. The resistivity was $1.7 \times 10^{-3}$ ohm-cm. at 300° K., rising only to $2.0 \times 10^{-3}$ ohm-cm. at 700° K.

EXAMPLE B

Replacement of part of the Bi in Bi$_2$Ru$_2$O$_7$ is one way to prepare a composition corresponding to the general formula $(M_xBi_{2-x})(M'_yM''_{2-y})O_{7-z}$. It was found that when Gd was substituted for Bi, a considerable increase in the resistivity occurred. The resistivity of GdBiRu$_2$O$_7$, prepared as described in Example 14, was measured as scribed in Example A. The resistivity was metallic-like, being $6 \times 10^{-3}$ ohm-cm. at room temperature and $5 \times 10^{-3}$ ohm-cm. at liquid nitrogen temperature. The resistivity changed little with change in temperature, rising to a value of only $8 \times 10^{-3}$ ohm-cm. at 800° K.

EXAMPLE C

Compatibility with glass at the firing temperatures required to fabricate electrical resistor compositions is a desirable attribute of a ceramic resistor component. The products of this invention possess this useful property. As shown in this example, compositions made from Bi$_2$Ru$_2$O$_7$ and glass are useful in ceramic resistor components (cf. FIG. 1).

A number of Bi$_2$Ru$_2$O$_7$/glass resistor compositions were made and tested, each containing different proportions of conductor and glass components. The resistor compositions were prepared by mixing in the proportions to be tested finely divided Bi$_2$Ru$_2$O$_7$ and glass frit. The glass was a low melting variety and was composed of 10% B$_2$O$_3$, 25% SiO$_2$ and 65% PbO by weight. The mixture of oxide and powdered glass frit was mixed with a vehicle consisting of 8% ethylcellulose and 92% β-terpineol to provide a suitable consistency. The mixture was then screen-printed through a 165-mesh screen onto an alumina (96% dense Al$_2$O$_3$) substrate. It should be noted that the dielectric substrate can be composed of many materials that will withstand the firing temperatures necessary to bind the resistor to the substrate. The substrate must also have a temperature coefficient of expansion which matches that of the glass binder closely enough to prevent the resistor composition from peeling away from the substrate on temperature cycling.

After the Bi$_2$Ru$_2$O$_7$/glass compositions had been applied to the dielectric substrate in uniform thickness, the compositions were dried to remove solvent. The assemblages were then fired in a conventional furnace at 750° C. over a 45-minute period. At the temperature of 750° C. the glass frit was molten, thereby bonding the conductive material to the ceramic dielectric substrate.

The resulting resistor compositions were about 0.001 inch thick. X-ray diffractometer data taken on a finished resistor showed that the $Bi_2Ru_2O_7$ was essentially unaffected by heating with the glass binder, since its X-ray pattern was unchanged. Results of resistivity measurements made on the various resistors fabricated by this method are set forth in Table III. The data in the table show, inter alia, the considerable latitude over which resistivity may be varied with retention of a low temperature coefficient of resistivity.

TABLE III

| Weight proportion of $Bi_2Ru_2O_7$ to low melting glass | Resistivity in ohms/square for a 0.001" layer | Temperature coefficient of resistivity over the range +25° C. to 125° C. in p.p.m./° C.[1] |
|---|---|---|
| 1.00:0.25 | 34.0 | −65 |
| 1.00:0.50 | 62.1 | −5 |
| 1.00:0.75 | 210 | +40 |
| 1.00:1.00 | 1,205 | +55 |
| 1.00:1.50 | 13,560 | +137 |

[1] As employed here and subsequently, temperature coefficient of resistivity (TCR) is the difference in resistivity between temperatures $T_1$ and $T_2$ divided by the product of resistivity at $T_1$ and the temperature difference in degrees, said quotient being multiplied by $10^6$.

EXAMPLE D

Substitution of other elements for Bi, Ru or Ir in $Bi_2(Ru,Ir)_2O_7$ in accordance with the general formula $(M_xBi_{2-x})(M'_yM''_{2-y})O_{7-z}$, wherein M, M', M'', $x$, $y$ and $z$ are as defined previously, enables controlled change in resistivity and temperature coefficient of resistivity (TCR) from that typical of unsubstituted $Bi_2Ru_2O_7$, and $Bi_2Ir_2O_7$. Table IV illustrates such changes. The resistor compositions were prepared as described in Example C with, however, an oxide; glass ratio of 42:58 parts by weight. The results clearly show that substitution alters resistivity and TCR.

TABLE IV

| Compound | Resistivity in ohms/square | TCR[1] Hot | TCR[1] Cold |
|---|---|---|---|
| $Bi_2Ru_2O_7$ | 1,600 | +163 | +157 |
| $Bi_2Ir_2O_7$ | 130,000 | −216 | −551 |
| $Cd_{0.1}Bi_{1.9}Ru_2O_{6.95}$[2] | 1,100 | +300 | +300 |
| $Bi_2IrRuO_7$ | 13,500 | +60 | −40 |

[1] Temperature coefficient of resistivity in parts per million/° C. over the following temperature ranges: Hot, +25 to +125° C.; Cold, −75 to +25° C.
[2] Prepared by grinding a mixture of 0.8920 g. of CdO, 20.2394 g. of $Bi_2O_3$, and 11.9763 g. of $RuO_2$ and firing it in a platinum crucible in air for about 72 hours. The product gave an X-ray diffraction pattern typical of a well-crystallized pyrochlore-type composition with perhaps, a slight trace of $RuO_2$.

EXAMPLE E $Bi_2Ru_2O_7$ is eminently suitable for use as an electrical heating element as shown in this example (cf. FIG. 2).

A bar (1 mm. by 2.5 mm. by 38 mm.) was obtained by pressing (conditions not critical) finely divided $Bi_2Ru_2O_7$ powder and sintering at 850° C. in vacuo for one day. The ends of the bar were coated with a silver paste which was bonded by heating at 750° C. in air. The silvered ends of this bar were then clipped onto platinum strips which served as electrical contacts. The platinum metal strips were connected to the electrical circuit which consisted of a 110-volt-variable transformer, a step-down transformer to reduce the maximum voltage to 2.5 volts, and a voltmeter and an ammeter. The power dissipated at various voltage settings is given in Table V. Temperatures as measured by an optical pyrometer are given for the last three settings, where this measurement technique became practical.

TABLE V

| Volts | Amperes | ° C. | Power (calculated watts) |
|---|---|---|---|
| 0.1 | 1.9 | | 0.19 |
| 0.2 | 3.1 | | 0.62 |
| 0.3 | 4.45 | | 1.33 |
| 0.4 | 5.9 | | 2.46 |
| 0.5 | 7.1 | | 3.55 |
| 0.6 | 8.1 | | 4.86 |
| 0.7 | 9.5 | | 6.65 |
| 0.8 | 10.2 | | 8.16 |
| 0.9 | 11.7 | | 10.5 |
| 1.0 | 12.2 | | 12.2 |
| 1.1 | 12.8 | 770 | 14.1 |
| 1.2 | 13.9 | 810 | 16.7 |
| 1.3 | 14.6 | 860 | 19.0 |

The upper temperatures that may be achieved by $Bi_2Ru_2O_7$ resistance heating are not limited to 860° C. and may range up to 1000° C. or higher. The $Bi_2Ru_2O_7$ resistance heating elements may be employed in a variety of ways familiar to those versed in the use of resistance heaters.

EXAMPLE F $Bi_2Ru_2O_7$ is also suitable for use as a component of electrical heating element compositions as shown in this example.

Finely divided $Bi_2Ru_2O_7$ and silver were mixed in 10:1 weight ratio. This mixture was then added to sufficient vehicle composed of 8% of ethylcellulose and 92% of $\beta$-terpineol to form a composition suitable for screen printing. The composition was then screen-printed through a 165-mesh screen onto several Pyroceram® pieces in a layer 0.001–0.005 inch thick. The Pyroceram® used was Corning 9608, one of a large family of extremely hard, nonporous, crystalline materials formed by precipitating a lithium aluminum silicate phase in sodium borosilicate glasses by the use of nucleating agents which act as crystallization centers. The ceramic with its printed circuit was dried at 100° C. for 15 minutes and then fired at 925° C. for 10 minutes. This treatment resulted in adherent thin layers of the resistor composition. Adherent layers were also obtained with $Bi_2Ru_2O_7$/glass mixtures (10:1 and 10:4 ratios by weight) treated in the same way.

Resistance measurements showed typical resistivities of the $Bi_2Ru_2O_7$/silver composition of the order of 7 ohms/square for a 0.001-inch coating. Typically, when 30 volts potential was impressed across the conductive composition, it reached a temperature of 600° C. with a 0.5 ampere current flow. The conductive compositions were stable at this temperature for a period of two weeks which was the longest period of observation.

Suitable resistor compositions contain approximately 20–85% by weight of $(M_xBi_{2-x})(M'_yM''_{2-y})O_{7-z}$. At lower concentrations the properties of the resistors approach those of the glass itself, and at higher concentrations the resistor compositions do not adhere well to the ceramic substrate.

Compositions containing $(M_xBi_{2-x})(M'_yM''_{2-y})O_{7-z}$ and 1–60% by weight of silver are suitable for use as electrical heating element compositions as are similar compositions containing 15–80% by weight of glass. At lower silver or glass percentages, the compositions do not adhere well to the ceramic substrate. At higher silver or glass percentages properties of the compositions approach those of glass or silver alone.

It is within the scope of this invention to prepare the $(M_xBi_{2-x})(M'_yM''_{2-y})O_{7-z}$ compositions by reaction of the requisite oxides in binders, e.g., glass.

Since obvious modifications and equivalents in the invention will be evident to those skilled in the chemical arts, I propose to be bound solely by the appended claims.

The embodiments of the invention in which an exclusive property or privilege is claimed are defined as follows:

1. Electrically conductive bismuth-containing oxides of pyrochlore-related crystal structure of the formula $$(M_xBi_{2-x})(M'_yM''_{2-y})O_{7-z}$$

wherein:

M is at least one of yttrium, thallium, indium, cadmium, lead and rare earth metals of atomic number 57–71, inclusive;

M' is at least one of platinum, titanium, chromium, rhodium and antimony;

M'' is at least one of ruthenium and iridium;

$x$ is a number in the range 0 to 1;

$y$ is a number in the range 0 to about 0.5, or a number in the range 0 to 1 when M' is rhodium or more than one of platinum, titanium, chromium, rhodium and antimony; and $z$ is a number in the range 0 to 1, being at least equal to about $x/2$ when M is divalent lead or cadmium.

2. The composition of claim 1 of the formula $Bi_2(Ru, Ir)_2O_7$.

3. The composition of claim 1 of the formula $Bi_2Ru_2O_7$.

4. The composition of claim 1 of the formula $Bi_2Ir_2O_7$.

5. The composition of claim 1 of the formula $Bi_2(M'_yM''_{2-y})O_7$, wherein M'M'' and $y$ are as defined in claim 1.

6. The composition of claim 1 of the formula $Bi_2(M'_yRu_{2-y})O_7$, wherein M' and $y$ are as defined in claim 1.

7. The composition of claim 1 of the formula $Bi_2(Rh_yRu_{2-y})O_7$, wherein $y$ is 0–1.

8. The composition of claim 1 of the formula $Bi_2RuRhO_7$.

9. The composition of claim 1 of the formula $Bi_2(M'_yIr_{2-y})O_7$, wherein M' and $y$ are as defined in claim 1.

10. The composition of claim 1 of the formula $Bi_2(Rh_yIr_{2-y})O_7$, wherein $y$ is 0–1.

11. The composition of claim 1 of the formula $(M_xBi_{2-x})Ru_2O_7$, wherein M is at least one of yttrium, thallium, indium and rare earth metals of atomic number 57–71, inclusive, and $x$ is a number in the range 0–1.

12. The composition of claim 1 of the formula $BiInRu_2O_7$.

13. The composition of claim 1 of the formula $Bi_{1.5}In_{0.5}Ru_2O_7$.

14. The composition of claim 1 of the formula $NdBiRu_2O_7$.

15. The composition of claim 1 of the formula $(M_xBi_{2-x})Ru_2O_{7-z}$, wherein M is at least one of cadmium and lead, $x$ is a number in the range 0–1, and $z$ is about $x/2$.

16. The composition of claim 1 of the formula $CdBiRu_2O_{6.5}$.

17. The composition of claim 1 of the formula $PbBiRu_2O_{6.5}$.

18. The composition of claim 1 of the formula $(M_xBi_{2-x})Ir_2O_7$, wherein M is at least one of yttrium, thallium, indium and rare earth metals of atomic number 57–71, inclusive, and $x$ is a number in the range 0–1.

19. The composition of claim 1 of the formula $BiNdIr_2O_7$.

20. The composition of claim 1 of the formula $(M_xBi_{2-x})Ir_2O_{7-z}$, wherein M is at least one of cadmium and lead, $x$ is a number in the range 0–1, and $z$ is about $x/2$.

21. A composition of matter for making electrical elements comprising a powdered mixture of a composition of claim 1 and a solid dielectric material.

22. An electrical element formed from a composition of claim 21.

23. An electrical element comprising a composition of claim 1.

24. An electrical element formed from a composition of claim 1 admixed with silver.

25. The electrical element of claim 24 in which the composition admixed with silver is $Bi_2Ru_2O_7$.

References Cited

Chem. Abstracts, vol. 65, 16213e (1966), "Many More Superconducting B. Phases."

DOUGLAS J. DRUMMOND, Primary Examiner

U.S. Cl. X.R.

23—15, 203; 252—521